United States Patent
Smith et al.

(10) Patent No.: US 10,355,854 B2
(45) Date of Patent: Jul. 16, 2019

(54) PRIVACY PRESERVING GROUP FORMATION WITH DISTRIBUTED CONTENT KEY GENERATION

(71) Applicant: Intel Corporation, Santa Clara, CA (US)

(72) Inventors: Ned M. Smith, Beaverton, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 501 days.

(21) Appl. No.: 14/972,931

(22) Filed: Dec. 17, 2015

(65) Prior Publication Data
US 2017/0180122 A1 Jun. 22, 2017

(51) Int. Cl.
H04L 9/08 (2006.01)
H04L 29/06 (2006.01)

(52) U.S. Cl.
CPC .......... H04L 9/0833 (2013.01); H04L 9/0822 (2013.01); H04L 9/0825 (2013.01); H04L 63/065 (2013.01)

(58) Field of Classification Search
CPC ... H04L 9/0833; H04L 9/0822; H04L 9/0825; H04L 63/065; H04L 63/0428; H04L 63/062; H04L 9/3247; H04L 9/088; H04L 9/3226; H04L 9/3234; H04L 63/105; H04L 9/0877; H04L 63/0853; H04L 2209/80; H04W 12/06; H04W 12/08; H04W 8/205; G06F 21/33; G06F 21/34; G06F 21/602;
(Continued)

(56) References Cited

U.S. PATENT DOCUMENTS 5,937,066 A * 8/1999 Gennaro ............... H04L 9/0841
380/286
6,330,671 B1 * 12/2001 Aziz ..................... H04L 9/0822
380/277
(Continued)

OTHER PUBLICATIONS

Kumari et al., Secure Group key Distribution Using Hybrid Cryptosystem, 2010, DOI 10.1109/ICMLC.2010.41, IEEE.*
(Continued)

Primary Examiner — Jason K Gee
Assistant Examiner — Shu Chun Gao
(74) Attorney, Agent, or Firm — Trop, Pruner & Hu, P.C.

(57) ABSTRACT

An embodiment includes a method executed by at least one processor of a first computing node comprising: form a first group of computing nodes, wherein forming the first group comprises providing (a)(i) a public key and a first seed value to each of second and third nodes, (a)(ii) second and third private keys, which both correspond to the public key and are unequal to each other, respectively to the second and third nodes; determine a first key encryption key (KEK) pair based on the first seed value; determine a second KEK pair based on (b)(i) a second seed value that is derived from the first seed value, and (b)(ii) determining a predetermined time period has expired; and receive a symmetric key encrypted with a public key of the second KEK and decrypting the encrypted symmetric key with a private key of the second KEK. Other embodiments are described herein.

24 Claims, 8 Drawing Sheets

(58) Field of Classification Search
CPC .. G06F 2221/2107; G06F 21/10; G06F 21/80; G06F 2221/0737; G06F 2221/0773
See application file for complete search history.

(56) References Cited

U.S. PATENT DOCUMENTS

| | | | | |
|---|---|---|---|---|
| 6,904,526 | B1* | 6/2005 | Hongwei | G06F 21/31 713/172 |
| 7,298,851 | B1* | 11/2007 | Hendricks | G06F 21/10 380/277 |
| 8,868,911 | B2* | 10/2014 | Tseng | H04L 9/3066 380/28 |
| 8,924,727 | B2* | 12/2014 | Smith | G06F 21/128 713/156 |
| 9,319,223 | B2* | 4/2016 | Nix | H04W 4/70 |
| 2004/0044891 | A1 | 3/2004 | Hanzlik et al. | |
| 2005/0152542 | A1* | 7/2005 | Zheng | H04L 9/0833 380/30 |
| 2005/0204161 | A1* | 9/2005 | Caronni | H04L 9/0822 726/5 |
| 2006/0129848 | A1* | 6/2006 | Paksoy | G06F 21/78 713/193 |
| 2007/0079381 | A1* | 4/2007 | Hartung | G06F 21/10 726/26 |
| 2010/0169645 | A1* | 7/2010 | McGrew | H04L 9/0822 713/170 |
| 2010/0169650 | A1* | 7/2010 | Brickell | H04L 9/3066 713/176 |
| 2012/0174181 | A1* | 7/2012 | Zhang | G06F 21/10 726/1 |
| 2012/0258777 | A1* | 10/2012 | Huang | H04W 4/60 455/557 |
| 2012/0266209 | A1* | 10/2012 | Gooding | H04L 63/20 726/1 |
| 2012/0303952 | A1 | 11/2012 | Smith et al. | |
| 2014/0006776 | A1* | 1/2014 | Scott-Nash | G06F 21/57 713/156 |
| 2014/0010371 | A1* | 1/2014 | Khazan | G06F 21/602 380/278 |
| 2014/0082359 | A1* | 3/2014 | Nakhjiri | H04L 9/0822 713/168 |
| 2014/0108805 | A1 | 4/2014 | Smith et al. | |
| 2014/0126719 | A1 | 5/2014 | Seisakusho | |
| 2015/0319150 | A1 | 11/2015 | Smith et al. | |
| 2016/0056957 | A1* | 2/2016 | Clarke | H04B 7/18593 380/285 |
| 2016/0218866 | A1* | 7/2016 | Patil | H04L 9/0833 |

OTHER PUBLICATIONS

Bobba et al. DLPKH—Distributed Logical Public-Key Hierarchy, 2007, ICISS 2007, LNCS 4812, pp. 110-127, 2007.*
Brickell et al. Enhanced Privacy ID: A Direct Anonymous Attestation Scheme with Enhanced Revocation Capabilities, the 6th Workshop on Privacy in the Electronic Society (WPES), Alexandria, Virginia, Oct. 2007. (Year: 2007).*
International Searching Authority, "Notification of Transmittal of the International Search Report and the Written Opinion of the International Searching Authority," dated Feb. 14, 2017, in International application No. PCT/US2016/062392.
Hardjono, T, et al., "Fluffy: Simplified Key Exchange for Constrained Environments," Network Working Group, MIT/Intel Corp., Mar. 23, 2015, 24 Pages.
Hardjono, T, et al., "Fluffy: Simplified Key Exchange for Constrained Environments," Network Working Group, MIT/Intel Corp., Jul. 3, 2015, 46 Pages.
Brickell, Ernie, et al., "Enhanced Privacy ID: A Direct Anonymous Attestation Scheme with Enhanced Revocation Capabilities," Intel Corporation, Aug. 17, 2007, 36 Pages.
Brickell, Ernie, et al., "Enhanced Privacy ID (EPID)," Intel Corporation, Slide show, Date Unknown, 22 Pages.
Intel Corporation, "Intel® Digital Random Number Generator (DRNG)," Software Implementation Guide, May 15, 2014.
Anati, Ittai, et al., "Innovative Technology for CPU Based Attestation and Sealing," Intel Corporation, Hardware and Architectural Support for Security and Privacy, 2013, 7 Pages.
United States Patent Office, 'File History, of U.S. Appl. No. 14/369,268, filed Jul. 24, 2014 entitled, Techniques and Architecture for Anonymizing User Data,' 155 Pages.
Intel Corportation, "Techniques for Distributing Secret Shares," U.S. Appl. No. 14/495,362, filed Sep. 24, 2015, 62 Pages.

* cited by examiner

JOIN_RSP

Skdc-realm = R1
Skdc-name = Dev0
Mcastrealm = R2
Mcastname = G1,gid1
grppac = G1 ACL, G1 Roles, G1 X.509 certificates, topic-list
Authtime = date
Nonce = n1
Endtime = date
Keydata = EPID Private Key (gid1, A, x, f), S1

Authenticator

Figure 3B

JOIN_REQ

Kty = EPID
Etype = epid2
Skdc-options = rsa_topic_gen
Skdc-realm = R1
Skdc-name = Dev0
Cpac = Group G1, G1 ACL Authenticator

Figure 3A

PRIVACY PRESERVING GROUP FORMATION WITH DISTRIBUTED CONTENT KEY GENERATION

BACKGROUND

The Internet-of-Things (IoT), as well as the Internet, is a distributed system of systems. Those systems link to each other through their communications with one another. The communications may take place in a publish-subscribe arrangement, where senders of messages (publishers) do not program the messages to be sent directly to specific receivers (subscribers) but instead characterize published messages into classes without knowledge of which subscribers, if any, there may be. Similarly, subscribers express interest in one or more classes and only receive messages that are of interest, without knowledge of which publishers, if any, there are. Producers may send data to a list of subscribers regularly according to an expected sampling rate or intermittently according to a trigger event such as when sampled data changes value. Data consumers may perform a topic specific data analysis and transformation to produce a result that adds value, dimension, or clarity to one or more data input streams. The resulting data stream may then be consumed by other subscribers.

Secure operation of such a system requires construction of groups, denoted by a topic name where multiple producers and consumers work together to achieve a common objective. The topic name represents this higher-level abstraction of a system of data subscription, transformation and publication. The data processing abstraction may further be expanded to support topic to topic interaction where a first topic produces an output that is consumed by a second topic and so forth. A data flow model such as this may be arbitrarily connected or nested so as to allow participation by virtually any form of data and any form of data flow.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

FIG. 2 includes a process in an embodiment concerning interactions within a group and between groups.

FIGS. 3A and 3B concern computing nodes joining a group.

DETAILED DESCRIPTION

Figure 1:
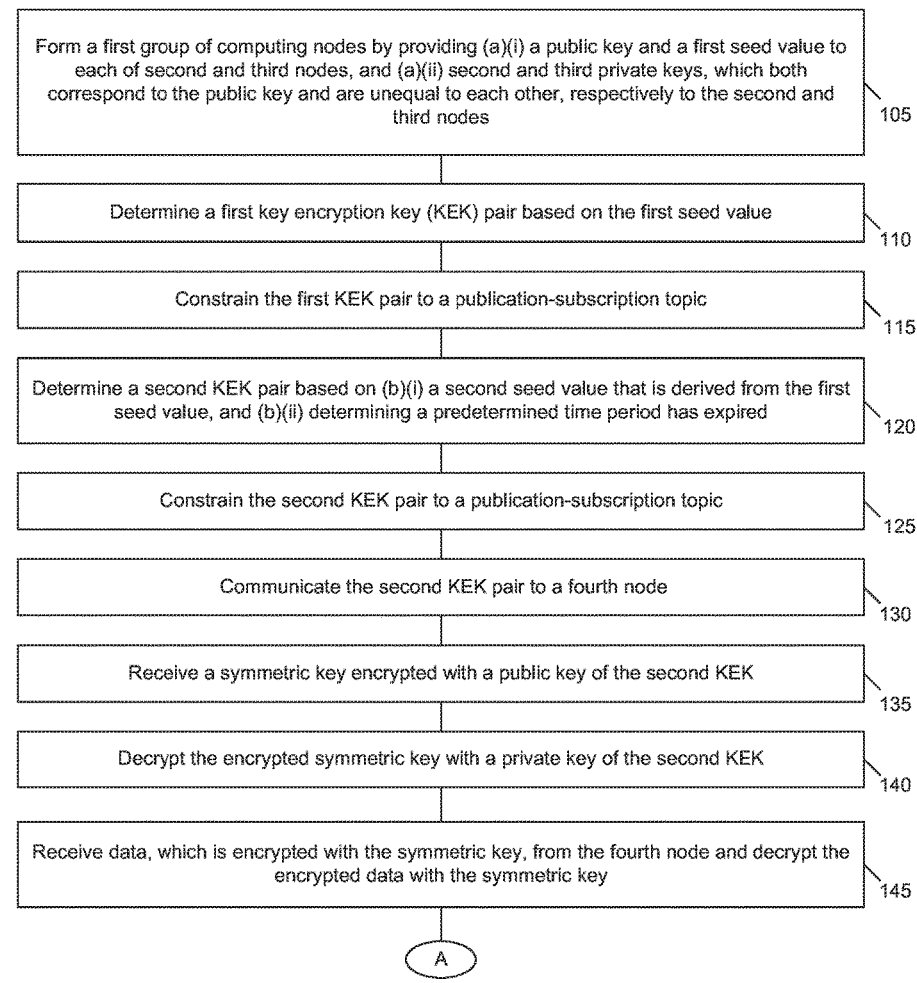
FIGS. 1-1 and 1-2 (collectively referred to herein as FIG. 1) include a process in an embodiment.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

Applicant determined a distributed privacy-preserving key management model or process is needed to address both security and scalability requirements for distributed systems, such as the IoT. An embodiment provides such a distributed privacy-preserving key management model.

More specifically, an embodiment manages behavior between computing nodes that belong to a logical group, such as the logical groups used in the Intel® Enhanced Privacy ID (EPID) technology. The behavior managed includes both intra-group and inter-group behavior. The embodiment uses access control lists (ACLs) and roles to manage the behavior. Groups are assigned role privileges that limit the scope of actions available to the group. ACLs specify the scope of data resources (that are group owned) that non-group entities are permitted to manipulate. An embodiment provides protection of data within distributed computing environments, such as the IoT. Protection includes integrity and confidentiality protection using data-specific symmetric keys. In other words, different active-data will have associated different symmetric content keys.

Applicant further determined distribution of content keys (to provide data protection) for active-data is a challenge. For example, there is not a presumption of a central key manager or authority in environments having nodes with limited capacities. However, an embodiment facilitates a key manager function that is interoperable with other active-data groups, consumers and producers.

Applicant further determined a well-known approach for distributing content keys is to wrap them using an RSA key encryption key (KEK). This approach suggests that KEKs are group specific (not device or node specific). As a result, a key management challenge is the provisioning of KEKs that aligns with group formation and lifecycle that ensures individual devices within the group have access to KEK keys for both receiving active-data subscriptions and for producing active-data targeted to a specific or intended consumer.

However, an embodiment provides a process for forming privacy preserving topic groups. Some embodiments utilize EPID to this end, whereas others may use technologies (e.g., Direct Anonymous Attestation (DAA) schemes such as RSA-based DAA or ECDSA signatures thereby used to authenticate group member interactions with external entities). In such embodiments joining the group also integrates establishing RSA KEK keys that may be topic specific. An embodiment further specifies a method for distributed KEK refresh that does not require a central distributor. The embodiment further integrates with the Fluffy key management system (see ***https://datatracker.ietf.org/doc/draft-hardjono-ace-fluffy/ for version 01) that defines intra-group key management primitives such as formation and scheme. This enables key lifecycle management that is common across multiple key types and contexts including key management for groups involving active-data.

An embodiment involves a protocol for would-be members to "join" a group that is orchestrated by a self-appointed (or delegated) device recognized as the "group leader". Would-be members request to join the group and the group leader determines appropriateness of the request. In an embodiment, the join protocol complies with EPID structure but further relies on Fluffy key management for message framing and protection.

An embodiment defines a mechanism for distributing the generation of RSA KEKs, which are made specific to topics in a pub-sub arrangement. A group may possess multiple KEKs corresponding to the various "topics" that the group uses to receive active-data from external consumers. Similarly, external consumers of group active-data may request receipt of this data protected using the foreign group/consumer KEK topic keys. Hence, the group leader may further use Fluffy containers to distribute topic specific public keys portions of KEK pairs corresponding to the active-data topics the group produces.

Applicant determined RSA based group KEK keys need to exist on multiple member devices since different members specialize in preparing content for publication. The internal details of how the group operates are superficial to the active-data that the group produces. Hence, group members need a copy of the KEKs. An embodiment proposes a method for distributed generation of KEKs using a seeded pseudorandom number generator (PRNG) by each member. The seed value is obtained from a value supplied during the EPID join protocol so that all group members can coordinate generation of the same key pair.

An embodiment further addresses the need for periodic KEK refresh by using entropy multiplexing to avoid periodic centralized key refresh. Without entropy multiplexing a group leader may otherwise become overwhelmed with key refresh requests resulting in failure to perform its other duties.

An embodiment provides distributed KEK refresh with each member deriving a pseudorandom number (PRN) tree using the seed value from the EPID group. The PRN tree encodes time intervals when it is appropriate to perform key refresh. Since the time of group establishment is known using the Fluffy receipt, a policy for periodic refresh can be applied subsequently without additional network traffic or coordination. Member devices are able to tell time. Policies determine the degree of freedom in which refreshed KEKs may be out of sync.

In an embodiment, the group leader occupies the role of EPID Issuer and Fluffy SKDC. The EPID join protocol is abstracted into Fluffy key management messages, namely JOIN-REQ and JOIN-RSP. The Fluffy container specifies the network topology and context in which the group exists so that proper pub-sub roles, ACLs, and other authorization related privileges can be applied uniformly.

Figures 1, 2:
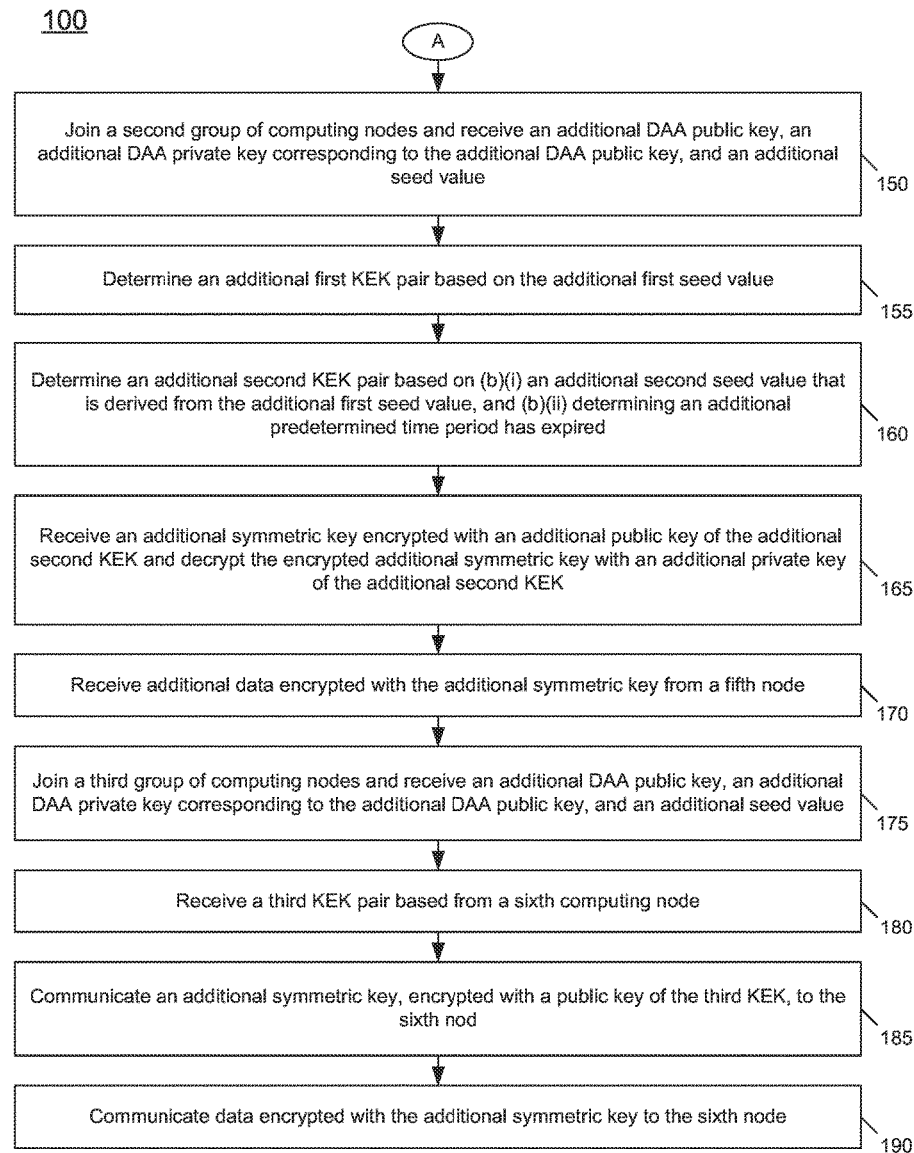
Figure 2:
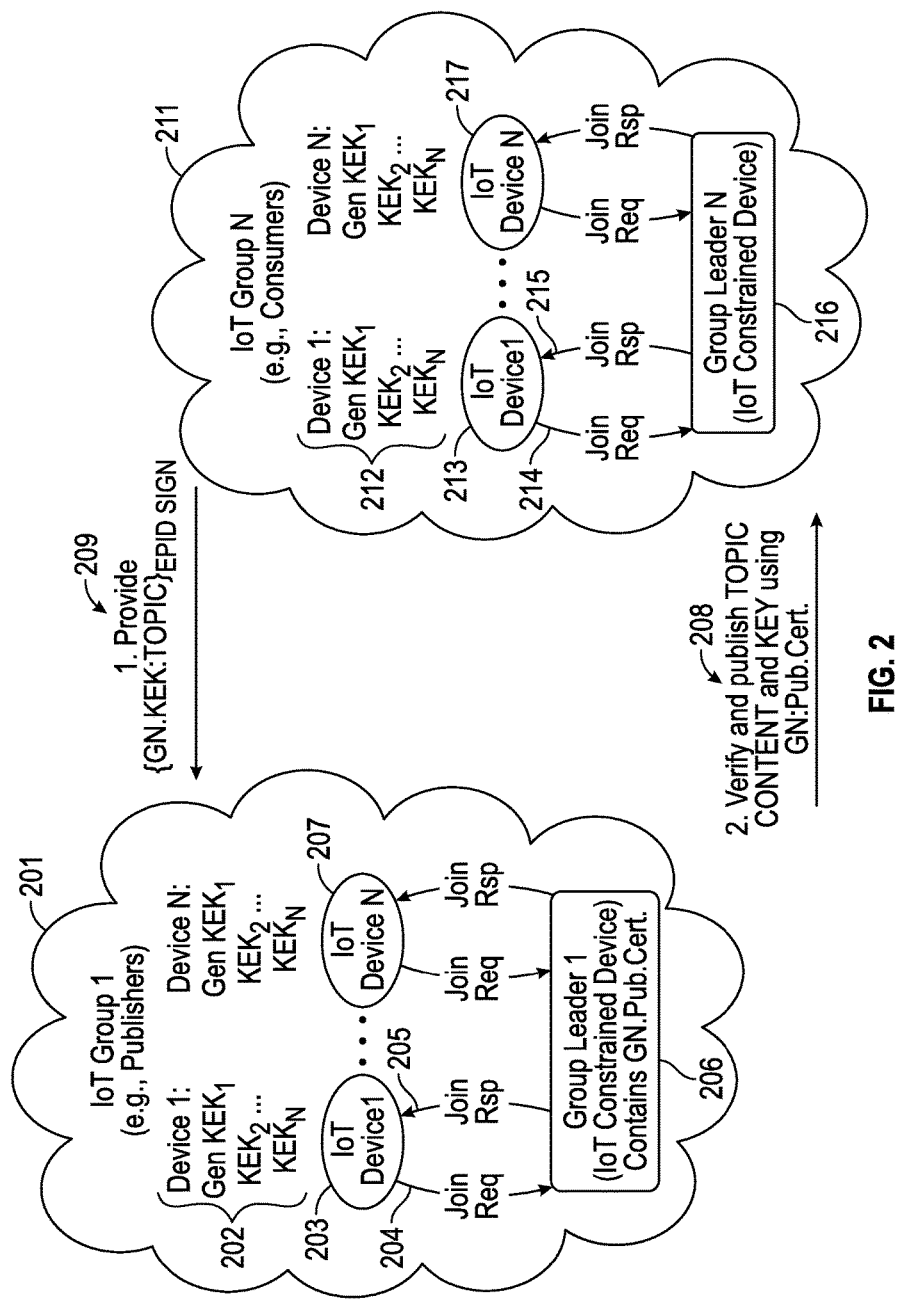

FIG. 1 includes a process 100 in an embodiment. FIG. 2 includes a process in an embodiment concerning interactions within a group and between groups. FIGS. 3A and 3B concern computing nodes joining a group. These figures are now discussed.

Block 105 includes forming a first group 211 of computing nodes 213, 216, 217 by providing (a)(i) a public key and a first seed value to each of second and third nodes, and (a)(ii) second and third private keys, which both correspond to the public key and are unequal to each other, respectively to the second and third nodes.

For example, an EPID protocol may be used to form an EPID group 211. Again, Intel® EPID schemes are cryptographic schemes that enable one to prove that he is a member in good standing in a group without revealing any information about his identity. For EPID there are three types of entities: issuer, members, and verifiers. The issuer is the entity that issues a unique private key to each member of the group. For group 211, the issuer is node 216 and the members are 213, 216, 217. Thus, node 216 can operate as a member as well as issuer. A member is an entity that may eventually try to prove membership in the group. If the prover is indeed a member in the group in good standing (i.e., the prover has a valid EPID private key that has not been revoked), the proof should be successful. The verifier is the entity who is trying to establish whether the prover is a member of the group. For group 211, issuer 216 may issue a private key to member 213, who may then attempt to send KEKs to a member 203, 206, 207 of group 201. However, any of members 203, 206, 207 may refuse those KEKs unless member 213 can prove it belongs to group 211. Members may include hardware devices (e.g., chipset, CPU, or graphics device) that store the private key (e.g., within secure memory. Secure memory may be included in, for example, a trusted execution environment (TEE) that leverages Intel® Software Guard Extensions (SGX), Intel® MemCore, Intel® Converged Security Engine (CSE), Intel® virtualization technology (VT-X), Intel® IOT-OS with Smack, ARM TrustZone, among other secure environments. The verifier could be software on the host, a hardware device, or a server on the Internet.

For each EPID group, there is a group public key and a group issuing private key (master key). The group issuing private key is used for generating a unique private key for each group member. Each member can use its EPID private key to digitally sign a message, such as message 209, and the resulting signature is called an EPID signature. The verifier can use the group public key to verify the correctness of an EPID signature (i.e., to verify that the signature was indeed created by a member with a valid EPID private key). The EPID signature, however, does not reveal any information about which unique private key was used to create the signature.

Returning to block 105, that block includes providing (a)(i) a public key and a first seed value to each of second and third nodes, and (a)(ii) second and third private keys, which both correspond to the public key and are unequal to each other, respectively to the second and third nodes.

FIG. 3A shows a message format member 213 may send to issuer, or group leader, 216. The message format may include elements of a Fluffy type container. For example, the request concerns, for example, a key type asking for an EPID key (Kty=EPID). The request may further include a desired algorithm (etype). This is the algorithm that is desired (or supported) by the sender of the request (client or service principal (SP)). Other elements of the request may include, for example, SKDC options (skdc-options). Rsa_topic_gen is requesting RSK KEKs for a topic. Skdc-realm concerns the name of the realm, domain or zone of the Simple Key Distribution Center (SKDC). The SKDC is the entity which mediates the establishment of the pair-wise shared key between the client and service principal. Client permissions (cpac), the JOIN_REQ (similar to a Fluffy PSK-REQ message) includes the permissions desired by the client for itself. In a GSK-REQ message this is the permissions desired by the client for the multicast group. Such permissions may include, for example, whether the members are publishers or subscribers for a certain topic.

FIG. 3B shows a message format member 216 (issuer, or group leader) may reply to member 213 with. The message format may include elements of a Fluffy type container. For example, in an embodiment the request concerns mcast-realm (this is the realm of the multicast group associated with the enclose group encryption key), mcastname (this is the identity of the multicast group associated with the enclosed group encryption key). The message may include grppac (permissions pertain to the members of the multicast group who share this common group encryption key), which provides ACLs, roles (publisher/subscriber/consumer) and the like for a pub-sub topic. The message may further include authtime, (the time at the SKDC when it created this receipt), which will be highly relevant in entropy multiplexing discussed below. The nonce helps avoid replay issues. Also, Keydata includes the EPID private key as well as the S1 seed, which is used in entropy multiplexing to generate KEKs. The EPID public key may be delivered outside the JOIN_RSP container. The container may secure the private key based on prior negotiated credentials (e.g., Diffie-Hellman exchange) between members 213, 216.

Thus, after block 105 is complete, group 211 may be formed whereby members 213, 216, 217 each include EPID public and private keys and a seed based on requests and replies 214, 215. The same process may be followed for group 201 to form another EPID group with members 203, 206, 207 based on requests and replies 204, 205.

Block 110 includes determining a first key encryption key (KEK) pair based on the first seed value. This could include any of members 213, 216, 217 determining these keys.

Figure 4:
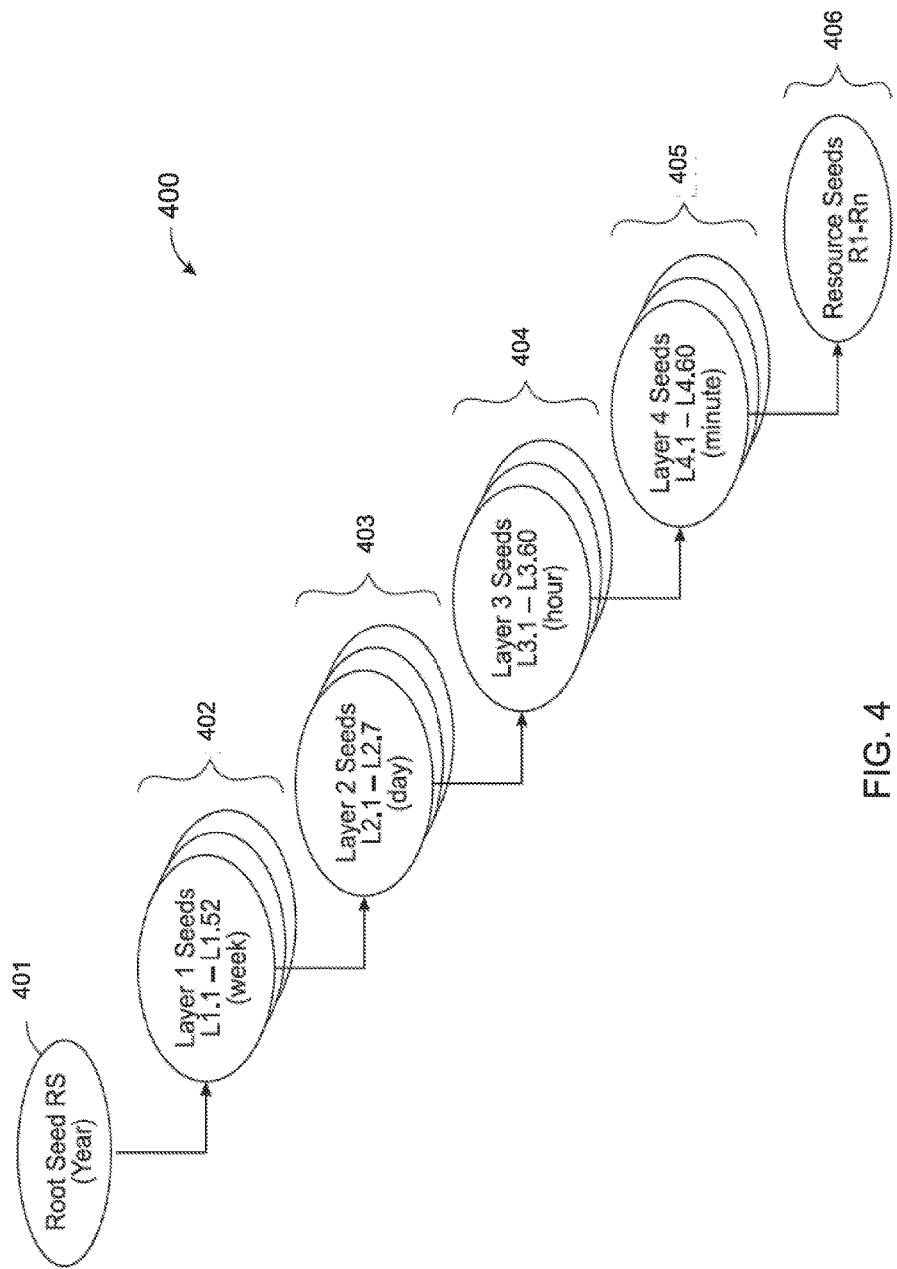
FIG. 4 addresses entropy multiplexing in an embodiment.

Referring now to FIG. 4, shown is an illustration of a representative pseudo-random seed (PRS) tree in accordance with an embodiment. This PRS tree 400 is used to generate random values that correspond to the time quanta in which messages exchanged across an Internet-hosted XMPP service may coordinate a rendezvous point that does not disclose connection metadata or other context information. As mentioned above, members 213, 216, 217 rely on the root seed (and the tree derived therefrom) to generate KEKs. The PRNG tree architecture may be used as the basis of a PRN-generation algorithm such that a device is provided with the ability to perform KEK generation based on a time quantum. Tree 400 depicts an architecture that is arranged in a seed encoding tree structure having a series of levels or layers 401, 402, 403, 404, 405, 406 that each have one or more PRNGs. Note that in other cases, a single PRNG can be used to generate seeds and then be re-seeded to generate further seeds and portions of a different tree structures. As illustrated, the PRNG tree structure is such that a random number seed generated for a given level is operative to seed one or more random number sequences at levels below the given level. This may result in generation of multiple parallel random number sequences populated as the random number generation extends to lower levels in which each given random number of a random number sequence received from a higher level may feed a separate PRNG at a level below. Each separate PRNG, in turn, may generate a new random number sequence in which each random number feeds a corresponding PRNG on a lower level.

Layer 402 addresses a "week" layer that includes seeds L1.1-L1.52 indicating the 52 weeks in year. Other layers continue the theme with, for example, layer 405 including 60 seeds for the sixty minutes of an hour. This continues to the "leaf" layer 406 that has resource seeds. Resource seeds R1-Rn are random numbers that may be used to generate KEKs. For example, resource seeds may be used to generate group elements. Thus, any of members 213, 216, 217 may know a time and date and consequently determine the proper resource seeds to generate group 211 elements (a0, a1, a2 . . . an) and from there, RSA KEK generation may be performed where Topic 1=(a0, a1) with a0 being the KEK public key and a1 being the KEK private key for that specific topic. Likewise, Topic 2=(a2, a3) for topic 2, and Topic n=(an, an+1) for topic n. Furthermore, p=primeRNG(a0), and q=primeRNG(a1) for topic 1, and the like.

Thus, subsequent to being admitted into the group, group members may generate KEK keys using the S1 parameter in the JOIN-RSP as the root seed (RS) for tree 400. The PRNG may be implemented in hardware or software such as the Intel® Digital Random Number Generator (DRNG). The seed value is used to derive a PRN tree that encodes a key refresh schedule such that each member can automatically switch to a new KEK in synchronized order without producing key management traffic over a network. In an embodiment, member nodes need to have access to a clock that is synchronized to wall clock time.

As shown above, the leaf node in the PRN tree produces a set of random values that may be used for RSA key generation. A group may determine to publish active-data using multiple topics. The topics of interest are provided as part of the JOIN-RSP message and may be updated by any subsequent Fluffy receipt or ticket. Topic 2—tuples of random values (aN, aN+1) are used to derive RSA values p and q respectively. This approach allows every member of the group to have some or all of the RSA topic keys without incurring key management/key distribution overhead.

Block 115 includes constraining the first KEK pair to a publication-subscription topic. For example, this may include element 209 whereby a Fluffy container, signed with the private EPID key of member 216. For example, the message "GN.KEK.TOPIC" may be public key for topic 1, which is constrained to only topic 1 due to an ACL, header information specifying realm, or the like. Of course, the group leader is not the only node that may distribute KEKs and other nodes distributing such keys (nodes 213, 217) may also similarly constrain the KEK pairs (both the private and the public keys of the KEK pair).

Block 120 includes determine a second KEK pair based on (b)(i) a second seed value that is derived from the first seed value, and (b)(ii) determining a predetermined time period has expired. This is addressing the multiplexing of FIG. 4 whereby additional KEKs are made as time progresses. Block 120 is just focusing on the use of the second KEK pair but could just as easily focus on the first KEK pair or nth KEK pair.

Block 125 is analogous to block 115.

Block 130 includes communicating the second KEK pair to a fourth node. The fourth node may include any of members 203, 206, 207. The fourth node does not possess a private key (that pertains to group 211) but does possess the public key (that pertains to group 211). Put another way, each member of group 211 possesses the public key (e.g., a DAA public key that pertains to group 211) and a private key (that pertains to group 211) and the fourth node is not included in the first group 211 (but is instead in group 201). In this particular example, the fourth node is a publisher and the first node is a subscriber and the data pertains to a publication-subscription topic the first node subscribes to.

Block 135 includes receive a symmetric key encrypted with a public key of the second KEK. Thus, this addresses a scenario where an EPID private key is used to send a KEK public key (element 209) to another group's member. That member may then wrap a session key ("KEY") (element 208) using the public key of the KEK pair. This may be encrypted with the EPID private key of group 201, and may be provided with a certificate including the EPID public key for group 201. Member 216 may then (block 140) decrypt the encrypted symmetric key ("KEY") with a private key of the second KEK. Block 145 includes receiving data, which is encrypted with the symmetric key, from the fourth node (which is a publisher) and decrypt the encrypted data with the symmetric key.

This process may be repeated spawning any number of KEK pairs 202, 212 that may be distributed from any of members 213, 216, 217 without reliance on any one member to distribute each set of KEK pairs and refresh numerous key pairs.

Blocks 150-170 may be performed completely independently from the other blocks in in FIG. 1, thus highlighting how a node's role (e.g., publisher vs. subscriber) and/or group can change based on the topic.

Block 150 includes a node, such as node 213 just for the sake of illustration, joining a second group of computing nodes and receiving an additional public key, an additional private key corresponding to the additional public key, and an additional seed value. Thus, this point of view is not from group leader 216 but instead from member 213 (or member 203 and the like).

Block 155 includes determine an additional first KEK pair based on the additional first seed value. Here, node 213 is determining a KEK pair without doing so through leader 216. Block 160 includes determining an additional second KEK pair based on (b)(i) an additional second seed value that is derived from the additional first seed value, and (b)(ii) determining an additional predetermined time period has expired. This entropy multiplexing allows the generation of refreshed KEKs without having to request the same from the group leader.

Block 165 includes receiving an additional symmetric key encrypted with an additional public key of the additional second KEK and decrypting the encrypted additional symmetric key with an additional private key of the additional second KEK. Block 170 includes receive additional data encrypted with the additional symmetric key from a fifth node. So, mere member 213 is just as capable of receiving published data (along with symmetric key needed to decrypt the content) as group leader 216.

Blocks 175-190 may be performed completely independently from the other blocks in in FIG. 1, thus highlighting how a nodes role (e.g., publisher vs. subscriber) and/or group can change based on the topic. Block 175 includes joining a third group of computing nodes and receiving an additional public key, an additional private key corresponding to the additional public key, and an additional seed value. Block 180 includes receiving a third KEK pair based from a sixth computing node. The sixth node may be, for example, node any of nodes 213, 216, 217. Thus, this shows how an element like node 216 can be a leader in a group (blocks 105-130), a member subscriber in another group (blocks 135-155), and a member publisher in yet another group (blocks 160-175). Block 185 includes communicate an additional symmetric key, encrypted with a public key of the third KEK, to the sixth node. Block 190 includes communicating data encrypted with the additional symmetric key to the sixth node.

An embodiment exists whereby computing node 216 receives data encrypted with the symmetric key "KEY" from nodes 213, 217 (which may be passing along data originally published by a member of group 201). For example, nodes 213, 217 may be proxies for node 216. For example, a special case of enrollment allows a subscriber to specify a set of Notification Consumers that are authorized to receive notifications on behalf of the Subscriber, so that Publisher messages that generate notifications can be delivered only to authorized notification consumers, and further constrained to notification consumers who are delegates of a subscriber.

Thus, as described above with regard to FIG. 1, an embodiment consists of a system of devices or nodes forming a first EPID group and a second system of devices or nodes forming a second EPID group. The groups may interact by the first group producing active-data and the second group consuming active-data where receipt of an active-datum signals actions to be taken by second group. In this model of interaction, the active-datum is replay, confidentiality and integrity protected using Fluffy containers where the first group produced data are encrypted using symmetric key and the symmetric key is encrypted using the KEK of the foreign group (second group).

In such an embodiment, group formation is performed using the EPID join protocol. This is accomplished using Fluffy key management containers JOIN-REQ and JOIN-RSP (FIGS. 3A and 3B). A would-be member sends a JOIN-REQ message to a device nominated as the group leader (e.g., device 216). The group leader will be trusted by all group members to manage addition and removal of group members. The group leader is also a group member.

An embodiment allows a system of constrained devices to form a group (e.g., group 211) where the group identity and credentials for interacting with external entities including other EPID groups (e.g., group 201) are shared among the various group members but where group member actions are not visible externally through use of any of the group credentials including EPID and KEK keys.

Key management scalability is improved through distributed KEK generation and refresh system (e.g., FIG. 4). The group leader may be a constrained device as its only additional load as group leader is to facilitate new member additions and deletions.

The group leader is trusted not to disclose group secrets externally. An embodiment may issue one or more KEKs per group. A group may be assigned one or more roles that any group member may assert using a Fluffy supplied ticket (i.e., IoT devices asserting a role would obtain a ticket encrypted to the external entity receiving active-data, including fields such as the "Cpac" field) or a group certificate extension may identify group roles.

Embodiments addressed herein provide numerous improvements. Examples follow.

An embodiment uses a seed (delivered with an EPID private key) to seed a PRN tree that is also used to perform distributed RSA key generation among EPID group members.

An embodiment uses an entropy multiplex PRN tree to perform periodic key refresh without incurring network traffic for synchronization or key management exchanges. Consequently the group leader can remain a constrained environment node avoiding saturation during key refresh cycles.

An embodiment includes elements of the EPID join protocol with a Fluffy key management container type, thereby providing security and anonymity.

An embodiment uses a Fluffy container to assign roles, ACLs, and KEK topics to an EPID group. Doing so provides for key management within a group and beyond the group.

An embodiment uses an EPID group to protect privacy of group members that produce and publish group content that is consumed by group and non-group members (where content is integrity and confidentiality protected using symmetric keys).

An embodiment uses a Fluffy SKDC to distribute KEK public keys to EPID group members for receipt of encrypted content from external producers that may consist of EPID groups producing active-data content.

An embodiment uses KEK topic keys where symmetric content keys are wrapped by a KEK topic key of a recipient group or consuming entity such that content is distributed only to an intended recipient group.

An embodiment uses active-data (topics) as a basis for inter-group interoperation where a rule applied to topic subscription may trigger an action that publishes new data or produces an action to be taken. For example, a stock ticker may produce a stream of stock price data for which a subscriber sets a rule directing a broker to sell a number of shares of stock when the price reaches a threshold value. A second group may subscribe to stock sale events triggering an action to distribute proceeds from the sale to a set of accounts.

An embodiment uses a Fluffy container to secure active-data for confidentiality, integrity, and replay protections. The container content type header establishes the contents as being active-data, as opposed to key management content types.

Yet still other advantages exist such as (1) leveraging the EPID join protocol for formation of IoT and web groups; (2) protecting join protocol payloads and publishing public RSA keys using fluffy containers; (3) distributed generation of group RSA KEKs using a seeded entropy multiplexing tree; (4) KEK refresh using an entropy multiplexing tree that avoids network traffic for key management and synchronization; (5) capability for publishers from one EPID group to publish topic content to one or more IoT clients or other EPID groups; (6) use of topic KEK keys for wrapping content keys used to protect data produced by one EPID group and consumed by another EPID group.

Figure 5:
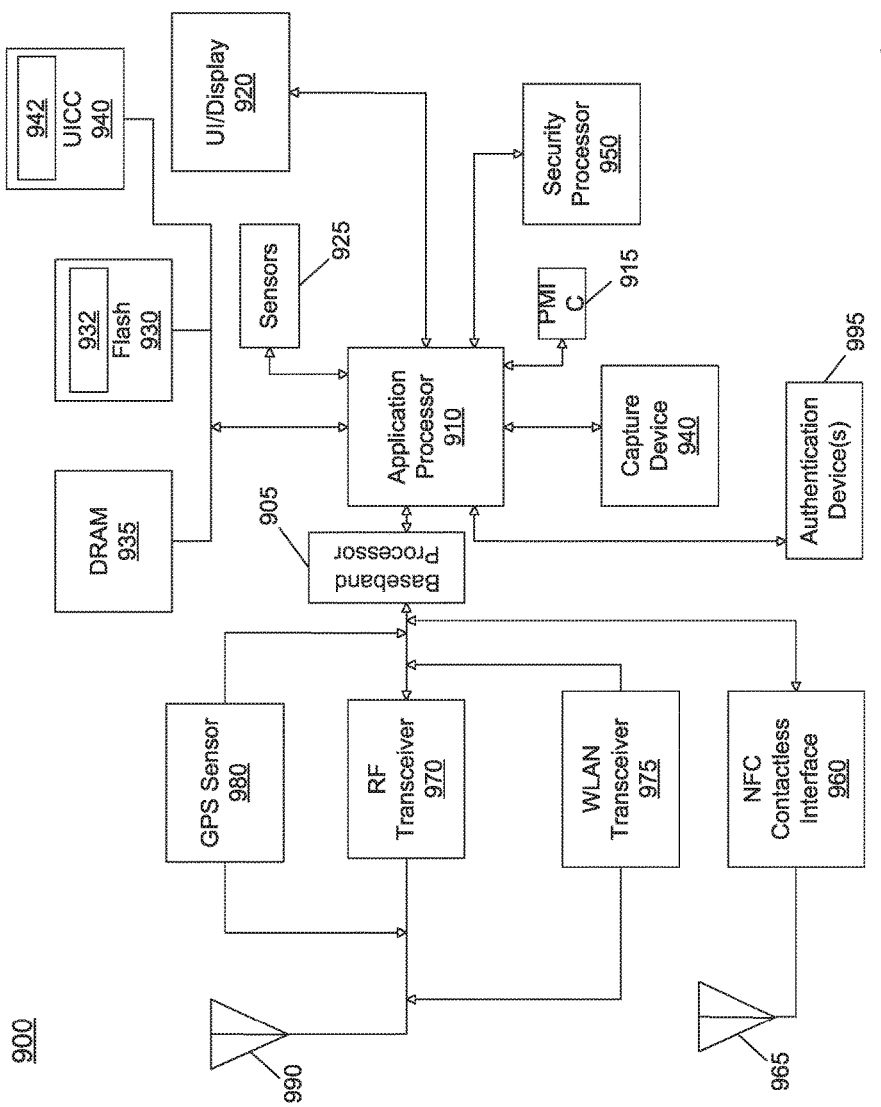
FIGS. 5, 6, and 7 include systems for use with embodiments.
Figure 6:
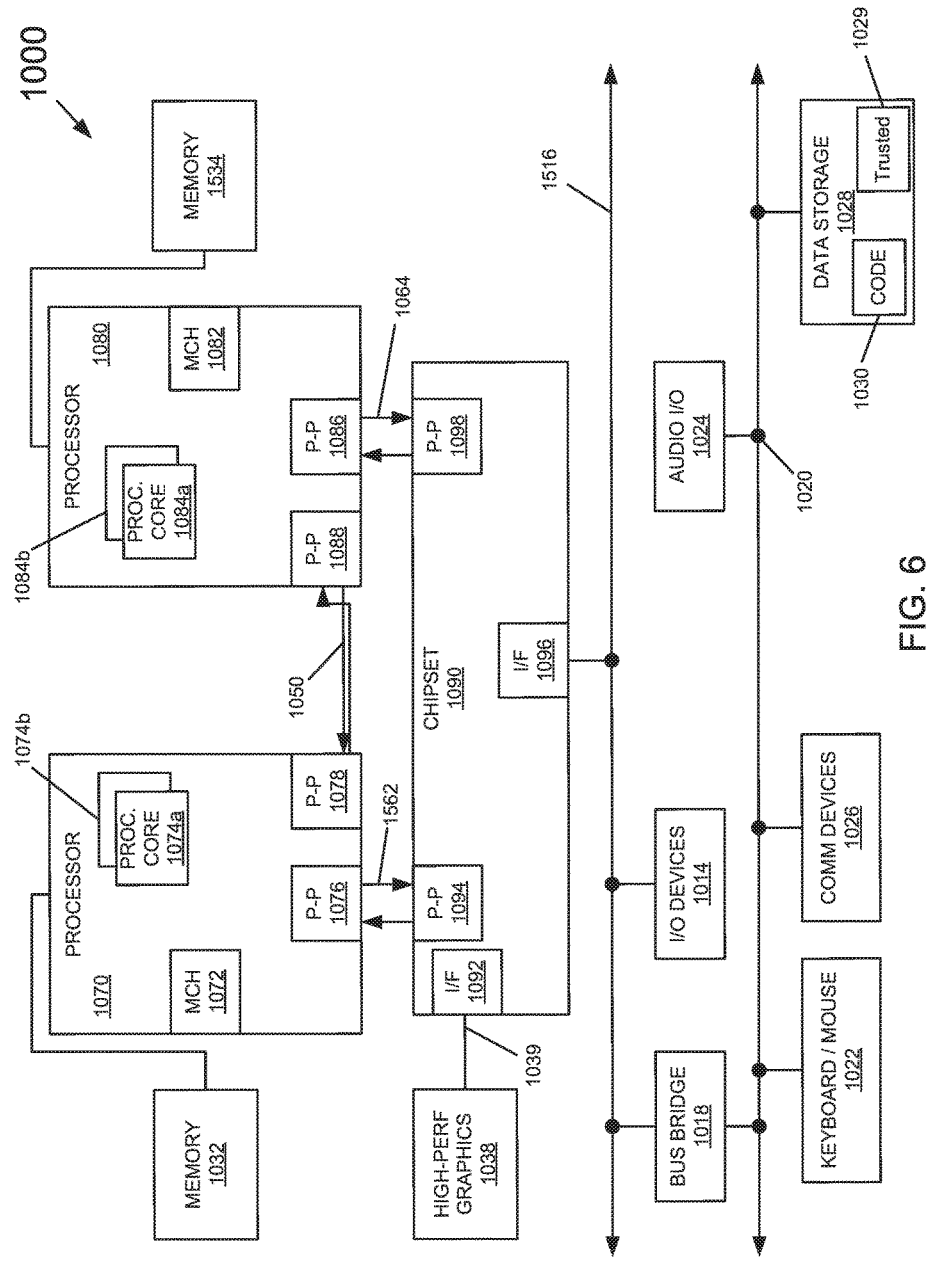

Referring now to FIG. 5, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920 (e.g., touch screen display). In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

A universal integrated circuit card (UICC) 940 comprises a subscriber identity module, which in some embodiments includes a secure storage 942 to store secure user information. System 900 may further include a security processor 950 (e.g., Trusted Platform Module (TPM)) that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, for example, user biometric input for use in authentication operations.

As further illustrated, a near field communication (NFC) contactless interface 960 is provided that communicates in a NFC near field via an NFC antenna 965. While separate antennae are shown, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitries may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol.

In an embodiment, transceivers 970 and/or 975 may include embodiments described herein, such as transmitters including varying substrate thickness and/or gratings at the silicon/BOX interface.

In addition a GPS sensor 980 may be present, with location information being provided to security processor 950 for use as described herein when context information is to be used in a pairing process. Other wireless communications such as receipt or transmission of radio signals (e.g., AM/FM) and other signals may also be provided. In addition, via WLAN transceiver 975, local wireless communications, such as according to a Bluetooth™ or IEEE 802.11 standard can also be realized.

Referring now to FIG. 5, shown is a block diagram of a system in accordance with another embodiment of the present invention. Multiprocessor system 1000 is a point-to-point interconnect system such as a server system, and includes a first processor 1070 and a second processor 1080 coupled via a point-to-point interconnect 1050. Each of processors 1070 and 1080 may be multicore processors such as SoCs, including first and second processor cores (i.e., processor cores 1074*a* and 1074*b* and processor cores 1084*a* and 1084*b*), although potentially many more cores may be present in the processors. In addition, processors 1070 and 1080 each may include a secure engine 1075 and 1085 to perform security operations such as attestations, IoT network onboarding or so forth.

First processor 1070 further includes a memory controller hub (MCH) 1072 and point-to-point (P-P) interfaces 1076 and 1078. Similarly, second processor 1080 includes a MCH 1082 and P-P interfaces 1086 and 1088. MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. Chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. Various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 7:
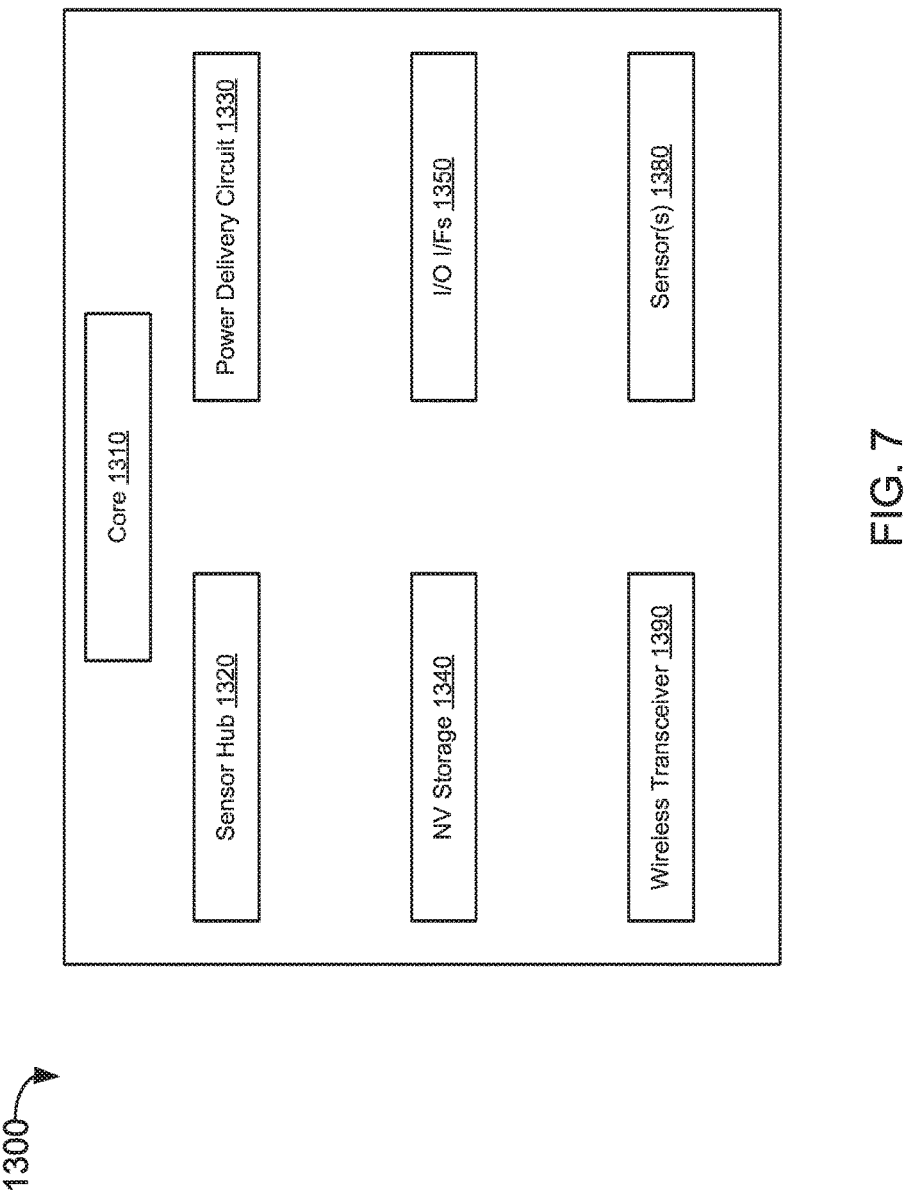

Embodiments may be used in environments where IoT devices may include wearable devices or other small form factor IoT devices. Referring now to FIG. 7, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I2C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms. Wearable and/or IoT devices have, in comparison with a typical general purpose CPU or a GPU, a small form factor, low power requirements, limited instruction sets, relatively slow computation throughput, or any of the above.

An embodiment provides the following: (1) A Group-B (e.g., group 211) public KEK is supplied to Group-A (e.g., group 201) when a Group-B participant subscribes to a topic (content) produced by Group-A, (2) Group-A public DAA/EPID key is supplied to the Group-B participant upon subscription, and (3) Group-A retains public KEK keys for all subscribers. However, since subscribers are members of a group. A second subscriber from the same group as the first subscriber is not required to supply the group's KEK and is not required to receive Group-A's DAA public key. This simplifies the key exchange overhead. It further simplifies Group-A management of subscriber keys. Consequently, when Group-A publishes content, the content can be protected using fewer number of encryption operations: (1) for encryption of the content with a content key, and (n) content key encryptions for the number of groups represented via subscription. Furthermore, published content may be signed using a DAA key allowing it to be authenticated to Group-A by Group-B—Group-n. This results in individual devices/users participating in the system may do so with an appropriate level of security but without placing unnecessary burden on key management systems that otherwise would attempt to manage pair-wise relationships between individual group members. Thus, key management scalability is much improved over current practices.

Example 1 includes At least one non-transitory storage medium having instructions stored thereon for causing a first computing node to: form a first group of computing nodes, wherein forming the first group comprises providing (a)(i) a public key, which corresponds to the first group, and a first seed value to each of second and third nodes, and (a)(ii) second and third private keys, which both correspond to the public key and are unequal to each other, respectively to the second and third nodes; determine a first key encryption key (KEK) pair based on the first seed value; determine a second KEK pair based on (b)(i) a second seed value that is derived from the first seed value, and (b)(ii) determining a predetermined time period has expired; and receive a symmetric key encrypted with a public key of the second KEK and decrypting the encrypted symmetric key with a private key of the second KEK.

In example 2 the subject matter of the Example 1 can optionally include instructions to cause the first computing node to receive data encrypted with the symmetric key from a fourth node.

In example 3 the subject matter of the Examples 1-2 can optionally include wherein the fourth node does not possess a private key that corresponds to the public key but does possess the public key.

In example 4 the subject matter of the Examples 1-3 can optionally include wherein: each member of the first group possesses the public key and a private key that corresponds to the public key; and the fourth node is not included in the first group.

In example 5 the subject matter of the Examples 1-4 can optionally include wherein the fourth node is a publisher and the first node is a subscriber and the data pertains to a publication-subscription topic the first node subscribes to.

In example 6 the subject matter of the Examples 1-5 can optionally include instructions to cause the first computing node to constrain the first and second KEK pairs to the publication-subscription topic.

In example 7 the subject matter of the Examples 1-6 can optionally include wherein the public key of the second KEK is constrained to the publication-subscription topic.

In example 8 the subject matter of the Examples 1-7 can optionally include instructions to cause the first computing node to: receive data encrypted with the symmetric key from the second node and additional data encrypted with the symmetric key from the third node; and decrypt the data and additional data with the symmetric key.

In example 9 the subject matter of the Examples 1-8 can optionally include instructions to cause the first computing node to determine the first KEK pair using a hardware-based random number generator (RNG).

In example 10 the subject matter of the Examples 1-9 can optionally include instructions to cause the first computing node to: provide a restraining temporal element with the private key; and determine the predetermined time period has expired based on the restraining temporal element.

In example 11 the subject matter of the Examples 1-10 can optionally include wherein the restraining temporal element is at least one of a date and a time.

In example 12 the subject matter of the Examples 1-11 can optionally include wherein the second and third private keys are configured to enable the second and third computing nodes to prove membership within the first group without revealing information that specifically identifies the second and third computing nodes.

In example 13 the subject matter of the Examples 1-12 can optionally include wherein: the first and second KEK pairs are RSA key pairs; and the public key and the second and third private keys are Direct Anonymous Attestation (DAA) keys.

In example 14 the subject matter of the Examples 1-13 can optionally include wherein the first node is a group leader for the first group and the second and third nodes are members, but not leaders, for the first group.

In example 15 the subject matter of the Examples 1-14 can optionally include instructions to cause the first computing node to: join a second group of computing nodes and receive an additional public key that corresponds to the second group, an additional private key corresponding to the additional public key, and an additional seed value; determine an additional first KEK pair based on the additional first seed value; determine an additional second KEK pair based on (b)(i) an additional second seed value that is derived from the additional first seed value, and (b)(ii) determining an additional predetermined time period has expired; and receive an additional symmetric key encrypted with an additional public key of the additional second KEK and decrypting the encrypted additional symmetric key with an additional private key of the additional second KEK.

In example 16 the subject matter of the Examples 1-15 can optionally include instructions to cause the first computing node to receive additional data encrypted with the additional symmetric key from a fifth node.

In example 17 the subject matter of the Examples 1-16 can optionally include the fifth node is a publisher and the first node is a subscriber and the data pertains to an additional publication-subscription topic, unequal to the publication-subscription topic, the first node subscribes to; the additional public key of the additional second KEK is constrained to the additional publication-subscription topic.

In example 18 the subject matter of the Examples 1-17 can optionally include instructions to cause the first computing node to join a second group of computing nodes and receive an additional public key, which corresponds to the second group, an additional private key corresponding to the additional public key, and an additional seed value; receive a third KEK pair based from a fourth computing node; and communicate an additional symmetric key, encrypted with a public key of the third KEK, to the fourth node.

In example 19 the subject matter of the Examples 1-18 can optionally include instructions to cause the first computing node to communicate data encrypted with the additional symmetric key to the fourth node.

In example 20 the subject matter of the Examples 1-19 can optionally include wherein: the first node is a publisher and the fourth node is a subscriber and the data pertains to an additional publication-subscription topic, unequal to the publication-subscription topic, the fourth node subscribes to; and the public key of the third KEK is constrained to the additional publication-subscription topic.

Example 21 includes method executed by at least one processor of a first computing node comprising: form a first group of computing nodes, wherein forming the first group comprises providing (a)(i) a public key and a first seed value to each of second and third nodes, (a)(ii) second and third private keys, which both correspond to the public key and are unequal to each other, respectively to the second and third nodes; determine a first key encryption key (KEK) pair based on the first seed value; determine a second KEK pair based on (b)(i) a second seed value that is derived from the first seed value, and (b)(ii) determining a predetermined time period has expired; and receive a symmetric key encrypted with a public key of the second KEK and decrypting the encrypted symmetric key with a private key of the second KEK.

In example 22 the subject matter of the Example 21 can optionally include the first computing node receiving data encrypted with the symmetric key from a fourth node.

Example 23 includes a device comprising: at least one hardware processor to execute instructions; at least one network interface to enable the at least one hardware processor to communicate with second and third computing nodes coupled in an Internet of Things (IoT); at least one non-transitory storage medium having instructions stored thereon for causing the at least one hardware processor to: form a first group of computing nodes, wherein forming the first group comprises providing (a)(i) a public key and a first seed value to each of second and third nodes, (a)(ii) second and third private keys, which both correspond to the public key and are unequal to each other, respectively to the second and third nodes; determine a first key encryption key (KEK) pair based on the first seed value; determine a second KEK pair based on (b)(i) a second seed value that is derived from the first seed value, and (b)(ii) determining a predetermined time period has expired; and receive a symmetric key encrypted with a public key of the second KEK and decrypt the encrypted symmetric key with a private key of the second KEK.

In example 24 the subject matter of the Examples 23 can optionally include a random number generator (RNG) coupled to the at least one hardware processor, wherein the at least one medium comprises instructions to cause the device to: receive data encrypted with the symmetric key from a fourth node; and determine the first KEK pair using the RNG.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions stored thereon for causing a first computing node to:
   form a first group of computing nodes, wherein forming the first group comprises providing (a)(i) a public key, which corresponds to the first group, and a first seed value to each of second and third nodes, and (a)(ii) second and third private keys, which both correspond to the public key and are unequal to each other, respectively to the second and third nodes;
   determine a first key encryption key (KEK) pair based on the first seed value;
   determine a second KEK pair (b)(i) based on a second seed value that is derived from the first seed value, and (b)(ii) in response to previously determining a predetermined time period has expired;
   receive a symmetric key encrypted with a public key of the second KEK and decrypting the encrypted symmetric key with a private key of the second KEK; and
   receive data encrypted with the symmetric key and decrypt the encrypted data with the symmetric key.

2. The at least one non-transitory medium of claim 1 comprising instructions to cause the first computing node to receive the encrypted data from a fourth node.

3. The at least one non-transitory medium of claim 2 wherein the fourth node does not possess a private key that corresponds to the public key but does possess the public key.

4. The at least one non-transitory medium of claim 3, wherein:
   each member of the first group possesses the public key and a private key that corresponds to the public key; and
   the fourth node is not included in the first group.

5. The at least one non-transitory medium of claim 2, wherein the fourth node is a publisher and the first node is a subscriber and the data pertains to a publication-subscription topic the first node subscribes to.

6. The at least one non-transitory medium of claim 5 comprising instructions to cause the first computing node to constrain the first and second KEK pairs to the publication-subscription topic.

7. The at least one non-transitory medium of claim 5, wherein the public key of the second KEK is constrained to the publication-subscription topic.

8. The at least one non-transitory medium of claim 1 comprising instructions to cause the first computing node to:
   receive the encrypted data from the second node and additional data encrypted with the symmetric key from the third node; and
   decrypt the encrypted data and the encrypted additional data with the symmetric key.

9. The at least one non-transitory medium of claim 1 comprising instructions to cause the first computing node to determine the first KEK pair using a hardware-based random number generator (RNG).

10. The at least one non-transitory medium of claim 1 comprising instructions to cause the first computing node to:
    provide a restraining temporal element with the private key; and
    determine the predetermined time period has expired based on the restraining temporal element.

11. The at least one non-transitory medium of claim 1, wherein the restraining temporal element is at least one of a date or a time.

12. The at least one non-transitory medium of claim 1, wherein the second and third private keys are configured to enable the second and third computing nodes to prove membership within the first group without revealing information that specifically identifies the second and third computing nodes.

13. The at least one non-transitory medium of claim 1, wherein:
    the first and second KEK pairs are RSA key pairs; and
    the public key and the second and third private keys are Direct Anonymous Attestation (DAA) keys.

14. The at least one non-transitory medium of claim 1, wherein the first node is a group leader for the first group and the second and third nodes are members, but not leaders, for the first group.

15. The at least one non-transitory medium of claim 1 comprising instructions to cause the first computing node to:
    join a second group of computing nodes and receive an additional public key that corresponds to the second group, an additional private key corresponding to the additional public key, and an additional seed value;
    determine an additional first KEK pair based on the additional first seed value;
    determine an additional second KEK pair (b)(i) based on an additional second seed value that is derived from the additional first seed value, and (b)(ii) in response to previously determining an additional predetermined time period has expired; and
    receive an additional symmetric key encrypted with an additional public key of the additional second KEK and decrypting the encrypted additional symmetric key with an additional private key of the additional second KEK.

16. The at least one non-transitory medium of claim 15 comprising instructions to cause the first computing node to receive additional data encrypted with the additional symmetric key from a fifth node.

17. The at least one non-transitory medium of claim 16, wherein:
    the fifth node is a publisher and the first node is a subscriber and the data pertains to an additional publication-subscription topic, unequal to the publication-subscription topic, the first node subscribes to;
    the additional public key of the additional second KEK is constrained to the additional publication-subscription topic.

18. The at least one non-transitory medium of claim 1 comprising instructions to cause the first computing node to:
    join a second group of computing nodes and receive an additional public key, which corresponds to the second group, an additional private key corresponding to the additional public key, and an additional seed value;
    receive a third KEK pair based from a fourth computing node; and
    communicate an additional symmetric key, encrypted with a public key of the third KEK, to the fourth node.

19. The at least one non-transitory medium of claim 18 comprising instructions to cause the first computing node to communicate data encrypted with the additional symmetric key to the fourth node.

20. The at least one non-transitory medium of claim 19, wherein:
    the first node is a publisher and the fourth node is a subscriber and the data pertains to an additional publication-subscription topic, unequal to the publication-subscription topic, the fourth node subscribes to; and
    the public key of the third KEK is constrained to the additional publication-subscription topic.

21. A method executed by at least one processor of a first computing node comprising:
    form a first group of computing nodes, wherein forming the first group comprises providing (a)(i) a public key and a first seed value to each of second and third nodes, (a)(ii) second and third private keys, which both correspond to the public key and are unequal to each other, respectively to the second and third nodes;
    determine a first key encryption key (KEK) pair based on the first seed value;
    determine a second KEK pair (b)(i) based on a second seed value that is derived from the first seed value, and (b)(ii) in response to previously determining a predetermined time period has expired;
    receive a symmetric key encrypted with a public key of the second KEK and decrypting the encrypted symmetric key with a private key of the second KEK;
    receive data encrypted with the symmetric key and decrypt the encrypted data with the symmetric key.

22. The method of claim 21 comprising the first computing node receiving the encrypted data from a fourth node.

23. A device comprising:
at least one hardware processor to execute instructions;
at least one network interface to enable the at least one hardware processor to communicate with second and third computing nodes coupled in an Internet of Things (IoT);
at least one non-transitory storage medium having instructions stored thereon for causing the at least one hardware processor to:
form a first group of computing nodes, wherein forming the first group comprises providing (a)(i) a public key and a first seed value to each of second and third nodes, (a)(ii) second and third private keys, which both correspond to the public key and are unequal to each other, respectively to the second and third nodes;
determine a first key encryption key (KEK) pair based on the first seed value;
determine a second KEK pair (b)(i) based on a second seed value that is derived from the first seed value, and (b)(ii) in response to previously determining a predetermined time period has expired; and
receive a symmetric key encrypted with a public key of the second KEK and decrypt the encrypted symmetric key with a private key of the second KEK;
receive data encrypted with the symmetric key and decrypt the encrypted data with the symmetric key.

24. The device of claim 23 comprising a random number generator (RNG) coupled to the at least one hardware processor, wherein the at least one medium comprises instructions to cause the device to:
receive the encrypted data from a fourth node; and
determine the first KEK pair using the RNG.

* * * * *

UNITED STATES PATENT AND TRADEMARK OFFICE
CERTIFICATE OF CORRECTION

PATENT NO. : 10,355,854 B2
APPLICATION NO. : 14/972931
DATED : July 16, 2019
INVENTOR(S) : Ned M. Smith and Rajesh Poornachandran Page 1 of 1

It is certified that error appears in the above-identified patent and that said Letters Patent is hereby corrected as shown below:

In the Claims

Column 15, Line 39, Claim 11 "claim 1" should be --claim 10--;
Column 16, Line 63, Claim 21 after "KEK;" insert --and--;
Column 18, Line 4, Claim 23 delete "and"; and
Column 18, Line 7, Claim 23 after "KEK;" insert --and--.

Signed and Sealed this
Tenth Day of December, 2019

Andrei Iancu
*Director of the United States Patent and Trademark Office*